(12) United States Patent
Fuller et al.

(10) Patent No.: US 10,541,870 B2
(45) Date of Patent: Jan. 21, 2020

(54) UNIFIED WORK BACKLOG

(71) Applicant: ServiceNow, Inc., Santa Clara, CA (US)

(72) Inventors: Scott Fuller, Woodinville, WA (US); Anna Kotliarevskaia, Amsterdam (NL); Colin O'Brien, Atlanta, GA (US); Tarun Murala, Santa Clara, CA (US); Madhu Geddam Umapathy, Santa Clara, CA (US); Nitin Lahanu Hase, Hyderabad (IN); Arun Vydianathan, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 93 days.

(21) Appl. No.: 15/792,518

(22) Filed: Oct. 24, 2017

(65) Prior Publication Data
US 2019/0102228 A1    Apr. 4, 2019

Related U.S. Application Data

(60) Provisional application No. 62/568,087, filed on Oct. 4, 2017.

(51) Int. Cl.
*G06Q 10/00*    (2012.01)
*H04L 12/24*    (2006.01)
(Continued)

(52) U.S. Cl.
CPC ........ *H04L 41/0859* (2013.01); *G06F 3/0481* (2013.01); *G06F 3/0482* (2013.01);
(Continued)

(58) Field of Classification Search
CPC ............... G06Q 10/06; G06Q 10/0631; G06Q 10/063114; G06Q 10/06313
See application file for complete search history.

(56) References Cited

U.S. PATENT DOCUMENTS 8,370,803 B1 * 2/2013 Holler ...................... G06F 8/36
  717/101
8,566,779 B2 10/2013 Sukhenko et al.
(Continued)

OTHER PUBLICATIONS

Lant, Michael; "How to Easily Prioritize Your Agile Stories", Software Development, Agile Methods and the Intersection of People Process and Technology, 2010, 7 pages.
(Continued)

*Primary Examiner* — Dong U Kim
(74) *Attorney, Agent, or Firm* — Fletcher Yoder PC

(57) ABSTRACT

Systems and methods are related to a global ranking for a unified list of tasks. From a plurality of work projects each having one or more tasks, a processor may receive a first set of selections of at least two work projects for generating a work backlog having a unified list of tasks. The processor may generate a list of potential tasks to include in the work backlog from the selected work projects. The processor may receive a second set of selections of one or more of the potential tasks to include in the work backlog. The processor may send signals to display the unified list of tasks of the work backlog based on the potential tasks selected. The unified list of tasks comprises at least two types of tasks from two different work projects having disparate priority metrics.

20 Claims, 8 Drawing Sheets

(51) Int. Cl.

| | |
|---|---|
| *G06F 9/50* | (2006.01) |
| *G06F 9/48* | (2006.01) |
| *G06F 9/46* | (2006.01) |
| *G06F 16/951* | (2019.01) |
| *G06F 9/54* | (2006.01) |
| *H04L 29/08* | (2006.01) |
| *G06F 9/451* | (2018.01) |
| *G06F 16/27* | (2019.01) |
| *G06F 16/2457* | (2019.01) |
| *G06F 16/242* | (2019.01) |
| *G06F 16/248* | (2019.01) |
| *G06F 11/30* | (2006.01) |
| *G06F 11/34* | (2006.01) |
| *G06F 3/0486* | (2013.01) |
| *G06Q 10/06* | (2012.01) |
| *G06Q 30/06* | (2012.01) |
| *H04L 12/26* | (2006.01) |
| *G06F 3/0484* | (2013.01) |
| *G06Q 30/00* | (2012.01) |
| *G06Q 50/18* | (2012.01) |
| *G06F 16/904* | (2019.01) |
| *G06F 3/0482* | (2013.01) |
| *G06Q 40/00* | (2012.01) |
| *G06F 16/30* | (2019.01) |
| *G06F 17/24* | (2006.01) |
| *G06F 3/0481* | (2013.01) |
| *H04L 29/06* | (2006.01) |
| *G06F 9/445* | (2018.01) |
| *G06F 21/57* | (2013.01) |

(52) U.S. Cl.
CPC ........ *G06F 3/0486* (2013.01); *G06F 3/04847* (2013.01); *G06F 9/451* (2018.02); *G06F 9/461* (2013.01); *G06F 9/4881* (2013.01); *G06F 9/5038* (2013.01); *G06F 9/547* (2013.01); *G06F 11/3006* (2013.01); *G06F 11/3452* (2013.01); *G06F 16/248* (2019.01); *G06F 16/2423* (2019.01); *G06F 16/24578* (2019.01); *G06F 16/27* (2019.01); *G06F 16/30* (2019.01); *G06F 16/904* (2019.01); *G06F 16/951* (2019.01); *G06F 17/246* (2013.01); *G06F 17/248* (2013.01); *G06Q 10/067* (2013.01); *G06Q 10/0635* (2013.01); *G06Q 10/06314* (2013.01); *G06Q 10/06315* (2013.01); *G06Q 10/06393* (2013.01); *G06Q 30/018* (2013.01); *G06Q 30/0603* (2013.01); *G06Q 30/0635* (2013.01); *G06Q 30/0641* (2013.01); *G06Q 40/12* (2013.12); *G06Q 50/184* (2013.01); *H04L 41/0803* (2013.01); *H04L 41/0843* (2013.01); *H04L 41/0893* (2013.01); *H04L 41/12* (2013.01); *H04L 41/22* (2013.01); *H04L 43/045* (2013.01); *H04L 43/08* (2013.01); *H04L 43/50* (2013.01); *H04L 63/1433* (2013.01); *H04L 63/20* (2013.01); *H04L 67/26* (2013.01); *G06F 3/0484* (2013.01); *G06F 9/44505* (2013.01); *G06F 21/577* (2013.01); *H04L 41/0879* (2013.01); *H04L 67/12* (2013.01); *H04L 67/34* (2013.01)

(56) References Cited

U.S. PATENT DOCUMENTS

| | | | |
|---|---|---|---|
| 9,075,544 B2 | 7/2015 | Boden et al. | |
| 9,135,590 B1 | 9/2015 | Liu | |
| 2006/0010418 A1* | 1/2006 | Gupta | G06Q 10/06 717/101 |
| 2007/0168918 A1* | 7/2007 | Metherall | G06Q 10/06 717/101 |
| 2010/0021870 A1* | 1/2010 | Patten | G09B 7/02 434/118 |
| 2010/0162215 A1* | 6/2010 | Purcell | G06F 8/77 717/127 |
| 2015/0082281 A1* | 3/2015 | Koenig | G06F 11/3668 717/124 |
| 2016/0335583 A1* | 11/2016 | Suntinger | G06Q 10/063114 |
| 2019/0050771 A1* | 2/2019 | Meharwade | G06Q 10/06313 |

OTHER PUBLICATIONS

Alassian Agile Coach Tutorials, Claire Maynard; "Step-by-step instructions on how to drive a scrum project—Learn Scrum with Jira Software", https://www.atlassian.com/agile/tutorials/how-to-do-scrum-with-jira-software; 15 pgs.

Alassian Agile Coach Tutorials, Claire Maynard; "Step-by-step instructions on how to drive a kanban project with Jira Software—Kanban Tutorial", https://www.atlassian.com/agile/tutorials/how-to-do-kanban-with-jira-software; 14 pgs.

Alassian Agile Coach Tutorials, Claire Maynard; "Step-by-step instructions to drive an advanced scrum program with Jira Software—Advanced scrum tutorial", https://www.atlassian.com/agile/tutorials/how-to-do-advanced-scrum-practices-with-jira-software; 5 pgs.

Alassian Agile Coach Tutorials, Max Rehkopf; "A guide on how to use and create epics in Jira Software—Jira Epics Tutorial", https://www.atlassian.com/agile/tutorials/epics; 20 pgs.

Alassian Agile Coach Tutorials, Max Rehkopf; "Step-by-step instructions on how to work with agile boards in Jira Software—Jira Agile Board Tutorial", https://www.atlassian.com/agile/tutorials/creating-your-agile-board; 6 pgs.

Alassian Agile Coach Tutorials, Max Rehkopf; "The guide to working with sprints in Jira Software—Jira Sprints Tutorial", https://www.atlassian.com/agile/tutorials/sprints; 8 pgs.

Alassian Agile Coach Tutorials, Max Rehkopf; "The guide to using versions in Jira Software—Jira Versions Tutorial", https://www.atlassian.com/agile/tutorials/versions; 9 pgs.

Alassian Agile Coach Tutorials, Max Rehkopf; "The guide to working with issues in Jira Software—Jira Issues Tutorial", https://www.atlassian.com/agile/tutorials/issues; 13 pgs.

Alassian Agile Coach Tutorials, Max Rehkopf; "The guide to using burndown charts in Jira Software—Jira Burndown hart Tutorial", https://www.atlassian.com/agile/tutorials/burndown-charts; 10 pgs.

* cited by examiner

| NUMBER | SHORT DESCRIPTION | RANK |
|---|---|---|
| STRY0000100 | STORY1 | 1000 |
| STRY0000200 | STORY2 | 2000 |
| STRY0000300 | STORY3 | 3000 |
| STRY0000400 | STORY4 | 4000 |
| STRY0000500 | STORY5 | 5000 |

US 10,541,870 B2

UNIFIED WORK BACKLOG

CROSS-REFERENCE TO RELATED APPLICATION

This Application claims priority to and the benefit of U.S. Provisional Application No. 62/568,087, entitled "PLATFORM COMPUTING ENVIRONMENT AND FUNCTIONALITY THEREOF, filed Oct. 4, 2017, which is herein incorporated by reference.

BACKGROUND

This section is intended to introduce the reader to various aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In various industries, complex projects may be broken down into specific tasks. Each project may include several tasks, and different projects may have different workers assigned to various roles in the project. These tasks may be prioritized according to various metrics, such as difficulty, urgency, and the like.

However, the tasks may be planned with respect to one another within each individual project. For example, a worker may work on different projects with different tasks of different task types. Because these tasks are planned within their respective projects, it may be difficult for the worker to determine which tasks to prioritize.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods described below relate to processor-based implementations for creating a unified list of tasks from various projects, where the unified list orders the tasks based on some comparable metric, such as priority. In some embodiments, a processor is operatively coupled to a memory. The processor may carry out instructions stored in the memory. The processor may execute instructions stored in the memory to receive an input from a user indicative of priority of a task with respect to other tasks in the unified list of tasks. The processor may re-rank the tasks based on one or more inputs received. By forming a unified list of tasks, a user may organize and plan a backlog of tasks to complete in an upcoming week, month, release, or the like.

To create the unified list of tasks, the processor may receive a selection of work projects that include tasks with different priority metrics. For example, the user may provide selections to select tables and/or filters based on projects associated with work assigned to the user. For instance, the user may be assigned to complete project tasks related to a first project and address problems related to a second project. As such, the processor may receive a selection of the tasks table filtered to the first project as a first work project and receive a second selection of the problem table filtered to the second project as the second work project.

Based on the work projects selected, the processor may generate a list of potential tasks to allow the user to select tasks to be added to the unified list of tasks. For example, the processor may generate the list of potential tasks to include tasks from the first work project and/or the second work project. The processor may receive a selection from the user of one or more of the potential tasks to include in the unified list of tasks. The processor may then display the unified list of tasks having the selected potential tasks from the first work project, the second work project, and/or further projects. This process may allow the user to choose which projects the user would like to track in the unified list of tasks. From the received selections regarding the tables and filters, the processor may update the potential list of tasks as new tasks are added that fit the criteria of the work project, such as the selected tables and filters.

Further, to rank the unified list of tasks, the processor may associate each task with a global ranking. The processor may associate the tasks with rankings that include gaps between each of the preceding and following tasks to allow the processor to adjust rankings of the tasks in the unified list without adjusting preceding tasks and following tasks each time a rank is adjusted. That is, the processor may insert tasks with ranks in the gaps while maintaining the same rankings of the nearby tasks. By having a global rank with gaps between the rankings, a client-computing device may distribute some processing of the re-rankings to the servers.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
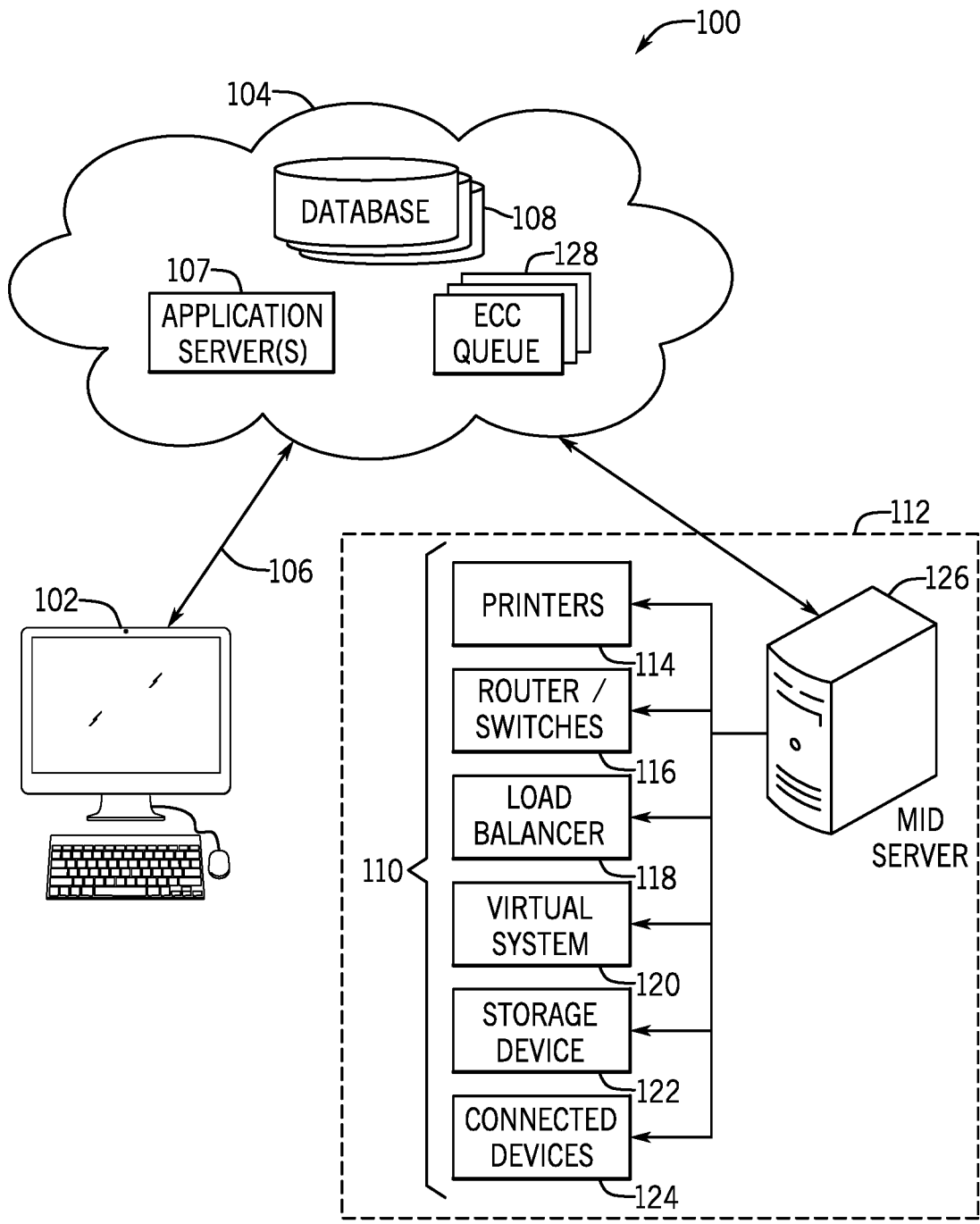
FIG. 1 is a block diagram of a distributed computing system used in performing a release, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

With the preceding in mind, systems and methods described below may be implemented via a processor or multiple processors of a computing device and/or a computing framework. As mentioned above, planning a project may involve dividing the project into a set of tasks. Depending on the size of the organization, there may be many different projects occurring with many different users. Additionally, each user may be associated with different projects from one another. As an example, a first user may be associated with projects A, B, and C, and a second user may be associated with project B, D, and E. Each user may also have different tasks for different projects, and the different tasks may be of various types and/or otherwise not readily comparable. For example, the tasks may include any suitable work or objectives to be completed, and may include stories from scrum projects, phase tasks from waterfall projects, problems, non-project meetings, user requests, bugs, and the like.

A first user may view tasks associated with each of the projects in which he is involved. Each of the tasks may have certain priorities with respect to one another within the project. However, the priorities of tasks within a project may not provide guidance as to which tasks overall should be completed first. For example, project A may be a high priority project with several low priority tasks, while project B may be a low priority project with several high priority tasks. Sometimes it may be desirable to have the low priority tasks of project A completed first, while other times the high priority tasks of project B should be completed first. That is, the tasks of the different projects may have disparate priority metrics, tasks may be characterized using different assessments of priority that are not comparable to each other, and/or the overall projects themselves may have different priorities or may logically need to be completed or worked in a particular sequence.

As described below, a unified list of tasks may be included in a work backlog to allow for a user to review any relevant tasks. That is, the work backlog may include different tasks from different projects for different users, or accounts, in the system. Further, the work backlog may include different task types in the same unified list. However, having an unsorted, unorganized list of different task types from different projects may not provide useful guidance to users on which tasks to complete due to different assessments in priority not being comparable to one another.

To overcome these problems, a technical solution of having a global or unified ranking for each task in the unified list of tasks may be used. That is, by combining various lists of different tasks and task types, the processor may maintain the unified ranking of the tasks with respect to one another. To maintain the unified ranking, the list of tasks may become a lengthy and time consuming causing a significant processing burden on the processor. For example, moving a task with a low rank to a high rank may cause a re-ranking each of the tasks following the re-ranked task, which may cause delays re-ranking the remaining list of tasks. In an embodiment, a task moved from rank 6 to rank 2 may cause ranks of 3, 4, and 5 to be re-ranked. In this example, several ranks of the list may be re-ordered due to re-ordering the task. Further, given that the unified ranking may include larger lists than previously organized by the processor, the larger lists may cause additional delays in the re-ranking. To reduce the time consuming and process-intensive aspect of re-ranking tasks in a potentially larger unified list, as explained below, each task may be ranked with respect to one another using an additional unified rank number with gaps between each of the numbers. By including gaps between the rank numbers the processor may be reduce the time complexity of re-sorting the list of tasks.

Furthermore, the computing framework and/or the MID server may divide aspects of the process of maintaining the unified ranking to prioritize the list of tasks. For example, the computing framework of a client may perform a first adjustment to the unified ranking, such as re-ranking two stories based on priority, during a first time (e.g., during business hours), and the MID server or another platform (e.g., application server, database server, etc.) may perform a second adjustment to the unified ranking, such as adjusting the gaps between the tasks to account for new ranks or to equalize a size of the gaps between each of the ranks. That is, the technical problem of long processing delays on the computing framework due to a larger task list may be addressed by the technical solution of having the unified rank with gaps between the ranks that allow for re-ordering on the platform while reducing the processing burden on the client device in maintaining the order.

The unified list of tasks may include tasks of different types. For example, certain projects may be planned according to a waterfall methodology and/or an agile methodology. A waterfall methodology may refer to a process in which phases of a project are completed in sequential order. For instance, requirements may be gathered in a first phase. Upon completion of gathering requirements, design of the application may begin in a second phase. After designing the application, implementation of the design may begin a third phase, and followed by testing in a fourth phase. Further, each of the phases may be associated with one or more phase tasks to complete to proceed to the next phase. A phase task refers to a unit of work that makes up a waterfall phase. While this is given as a general example of the waterfall methodology, any suitable tasks may be used in accordance with the present approach.

An agile methodology may refer to a short, fixed schedule of cycles performed in an iterative process, called a sprint. During a sprint, a worker will complete a software feature from an end-user perspective, referred to as a story, from the backlog of software features desired to be included in the application. That is, upon completion of the story, a feature of the project is developed such that it may be included into the application in further releases. For example, the story may be a feature or functionality that is ready for distribution/use (e.g., provided to an end user). A release may include more than one story that has been completed in the release.

Waterfall phase tasks and stories may generally be unrelated and not ranked with respect to one another. For instance, waterfall phase tasks may be ranked with respect to other waterfall phase tasks in the waterfall project and stories may be ranked with respect to other stories in the agile project, but the waterfall phase tasks and the stories may be unranked with respect to one another as they are typically not directly comparable. While waterfall phase tasks and stories are used as an example of tasks that may be grouped into the unified list of tasks, any suitable tasks may be included. For example, problems that are unrelated to a particular project and used to address problems in a certain system may be included in the unified list as well.

As described in detail below, a system may include a processor operatively coupled to a memory. The processor may execute instructions from the memory to cause the system to receive a selection of two or more work projects. As mentioned above, these work projects may include tasks of different types with the tasks unranked with respect to each other. The processor may generate a list of potential tasks to include in a work backlog from the selections. The processor may receive a selection of one or more of the potential tasks to include in the work backlog. The work backlog is a unified list of tasks to be performed for all the selected tasks from the work projects. The processor may display the unified list of tasks of the work backlog including the potential tasks selected. The unified list of tasks may include at least two types of tasks having disparate priority metrics. The work backlog may include a list of tasks associated with an account of a worker, a scrum master, or the like. The unified list of tasks may include a global ranking of each of the tasks with respect to one another. In some embodiments, the global ranking of each of the tasks may include gaps between the numbers to reduce processing associated with changes to rankings.

By way of introduction to the present concepts and to provide context for the examples discussed herein, FIG. 1 is a block diagram of a system 100 that utilizes a distributed computing framework, which may be used perform one or more of the techniques described herein. As illustrated in FIG. 1, the distributed computing framework may include a client 102 that communicates with a platform 104, such as a cloud service platform, over a communication channel 106. The client 102 may include any suitable computing system and may include client application programs that run on the respective computing system. Although only a single client 102 is shown connected to the platform 104, it should be noted that platform 104 may connect to multiple clients (e.g., tens, hundreds, or thousands of clients).

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104.

Through the platform 104, the client 102 may connect to various devices running application programs on one or more nodes or other devices that may be accessed via the platform 104. For example, the client 102 may connect to an application server 107 and/or one or more databases 108 via the platform 104. The application server 107 may include any computing system capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables having information about assets and services controlled by the client 102 which may be used by one or more of the processed described herein. By way of example, in some instances a database 108 may store information about assets and services such as configuration items (CIs) 110 on a network 112 (or group of networks). The CIs 110 may include hardware resources, software resources, virtual resources, and/or storage constructs that may be implicated in tasks managed or ordered in accordance with the techniques discussed herein. For example, the illustrated embodiment of the CIs 110 includes printers 114, routers/switches 116, load balancers 118, virtual systems 120, storage devices 122, and/or other connected devices 124. In the depicted topology, access to the CIs 110 from the platform 104 is enabled via a management, instrumentation, and discovery (MID) server 126 via a communication channel, such as an external communications channel queue 128, though in other implementations the MID server may be absent. As discussed herein processes and/or routines associated with the present approach may be performed on the one or more of the above-mentioned devices, nodes, or platforms.

Figure 2:
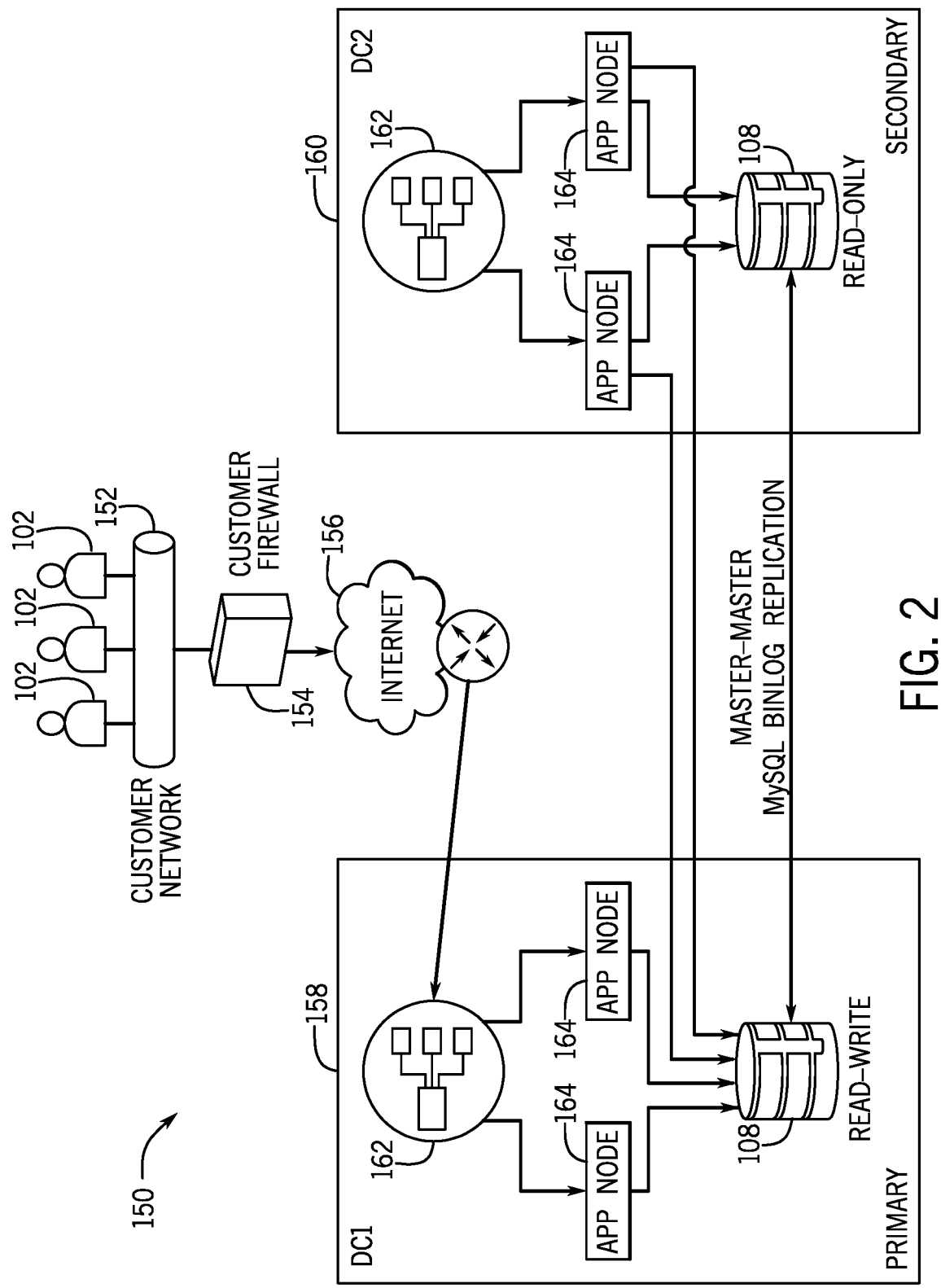
FIG. 2 is a schematic of an embodiment of a multi-instance architecture that may be utilized by the distributed computing system of FIG. 1, in accordance with an embodiment.

FIG. 2 is a schematic of an embodiment of a multi-instance architecture 150 that may be utilized by the distributed computing system 100 of FIG. 1. As shown, one or more clients 102 are connected to a customer network 152, which may or may not be protected by a firewall 154. The one or more clients 102 may access first and second virtual machines 158, 160 via the Internet 156. In the illustrated embodiment, the first virtual machine 158 is a primary virtual machine 158 and the second virtual machine 160 is a secondary virtual machine. The primary and secondary virtual machines 158, 160 are disposed in different data centers. Other embodiments may include more than two virtual machines (e.g., multiple secondary virtual machines). As shown, each of the virtual machines 158, 160 includes at least one load balancer 162, multiple application nodes 164, and a DB 108. In the illustrated embodiment, the database 108 of the primary virtual machine 158 is read-write and the database 108 of the secondary virtual machine 160 is read-only. The databases 108 are replicated via MySQL binlog replication for near real-time replication between the primary database 108 and the secondary database 108. As shown, the application nodes 164 of the primary virtual machine 158 may access the primary database 108, while the applications nodes 164 of the secondary virtual machine 160 may access both the primary database 108 and the secondary database.

Each customer may have its own dedicated virtual machines 158, 160 and database processes. Further, full and incremental backups may be scheduled as the customer wishes (e.g., daily, weekly, bi-weekly, monthly, etc.). The multi-instance architecture 150 results in full instance redundancy for all production instances with near real time replication and no comingling of data between customers. By providing customers with their own database(s) 108, customers are isolated from database maintenance and/or database failure of other customers. Further, maintenance and repair windows are shorter. In some embodiments, a client may pull data from multiple different databases 108 distributed over multiple virtual machines 158 and/or data centers. The pulled data may then be combined and used as inputs to perform a task, such as dynamic scheduling of service appointments.

Figure 3:
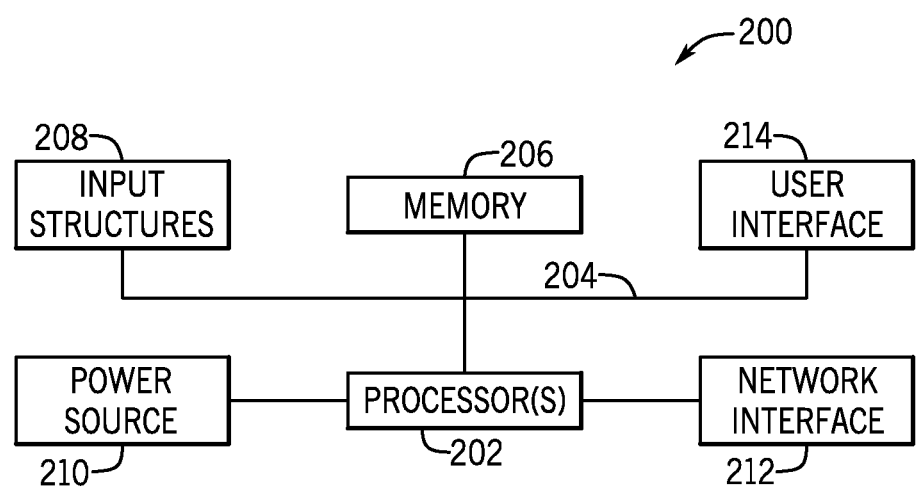
FIG. 3 is a block diagram of a computing device in the distributed computing system of FIG. 1, in accordance with aspects of the present disclosure.

The various computing devices noted above may include one or more of the computer components as depicted in FIG. 3. FIG. 3 generally illustrates a block diagram of example components of a computing device 200 and their potential interconnections or communication paths. As briefly mentioned above, the computing device 200 may be an embodiment of the client 102, the application server 107, a database server (e.g., databases 108), other servers or processor-based hardware devices present in the platform 104 (e.g., server hosting the communication queue 128), a device running the MID server 126, and/or any of the CIs. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components, such as, but not limited to, one or more processors 202, one or more busses 204, memory 206, input structures 208, a power source 210, a network interface 212, a user interface 214, and/or other computer components useful in performing the functions described herein. The one or more processors 202 may include processor capable of performing instructions stored in the memory 206. For example, the one or more processors may include microprocessors, system on a chips (SoCs), or any other circuitry performing functions by executing instructions stored in the memory 206 or another accessible location. The one or more busses 204 include suitable electrical channels to provide data and/or power between the various components of the computing device. The memory 206 may include any tangible, non-transitory, and computer-readable storage media. The input structures 208 provide structures to input data and/or commands to the one or more processor 202, such as a positional input device, such as a mouse, touchpad, touchscreen, and/or the like. The power source 210 can be any suitable source for power of the various components of the computing device 200. A network interface 212 is also coupled to the processor 202 via the one or more busses 204 and includes one or more transceivers capable of communicating with other devices over one or more networks (e.g., the communication channel 106). Further, a user interface 214 may include a display that is configured to display images transferred to it from the one or more processors 202.

As described in detail below, the processor 202 may generate a user portal. The user portal may be the user interface 214 that displays a view in which any type of project task or other task associated with the user (e.g., a worker) may be selected for time to be entered in the same user interface 214.

The systems and methods described herein may be performed on the one or more processors 202 of one or more computing devices 200 of the client 102, the platform 104, the MID server 126, or any suitable combination. As mentioned above, planning a project may involve dividing the project into a set of tasks. Depending on the size of the organization, there may be many different projects occurring with many different workers. Additionally, each worker may be associated with different projects from one another. For example, the tasks may include any suitable work or objectives to be completed, and may include stories from scrum projects, phase tasks from waterfall projects, problems, non-project meetings, user requests, bugs, and the like.

Figure 4:
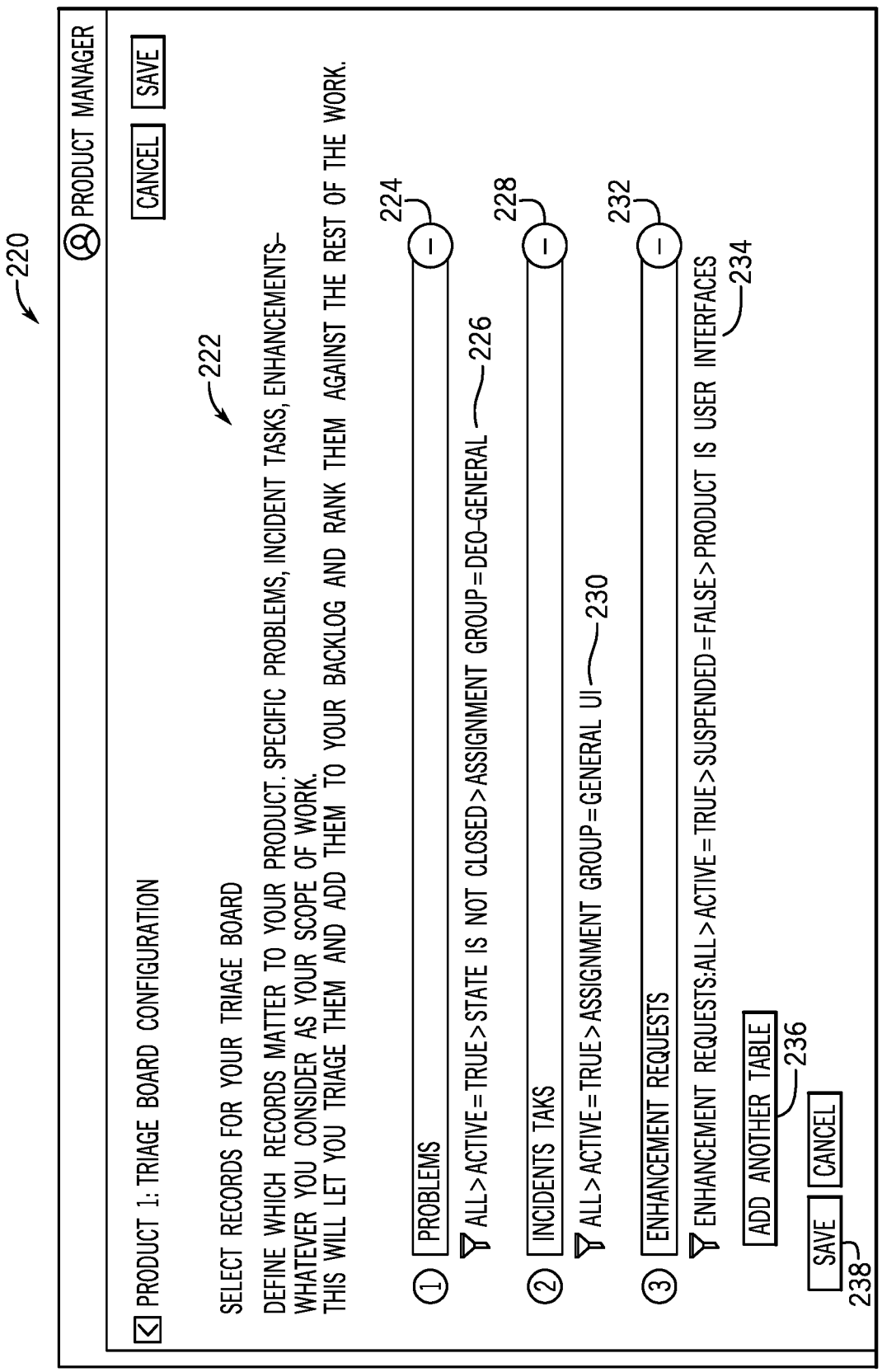
FIG. 4 is an example of a screenshot displaying a user interface to select work projects to triage, in accordance with aspects of the present disclosure.

FIG. 4 is a screenshot of a user interface 220 of a triage board 222. The triage board 222 may include one or more fields, drop downs, or lists, to receive inputs of selections, from a user, the computing device 200, or another computing device, of one or more projects to be associated with the user. The user, in this example, may be a scrum master or a product manager who maintains the list of tasks for a team, or the user may be an individual worker who maintains the list of tasks individually. While the explanations below use the list of tasks of a worker as an example, the list of tasks may be any list associated with a login account. In some embodiments, the selections may be generated via the computing device 200 or another computing device. That is, the computing device 200 may be able to determine tendencies or work projects associated with the user without the user's input.

The input may be based on what projects the user is currently working on or otherwise interested in. For example, if the user is a team member of a certain project, the user can provide inputs via the user interface 220 to select the problems associated with that particular project. In the illustrated embodiment, the processor 202 may receive a table selection 224, 228, and 232 with one or more respective filter settings 226, 230, and 234 to limit which tasks in the each of the table selections 224, 228, and 232 are to be included in a list of potential tasks, as described below in conjunction with FIG. 5. As mentioned above, the list of potential tasks may include problems, incidents, stories, phase tasks, or any other suitable task. The user interface 220 may include an add button 236 to add additional tables, as the user undertakes new projects, and a save button 238. Upon receiving a save input (e.g., clicking or depression of the save button 238), the processor 202 may save a search query associated with each of the table selections 224, 228, and 232 with each of the respective filter settings 226, 230, and 234. That is, upon receiving each of the selections 224, 228, 232, the processor 202 may search each of the table selections 224, 228, and 232 based on the respective filter settings 226, 230, and 234 to provide the user with the list of potential tasks. By limiting queries based on the table selection 224, 228, and 232 with the respective filter settings 226, 230, and 234, the processor 202 may provide queries based on one or more work projects associated with the user. Work projects may refer to projects associated with the user (e.g., assigned to the worker) as defined by the table selection 224, 228 and 232 with the respective filter settings 226, 230, and 234.

Figure 5:
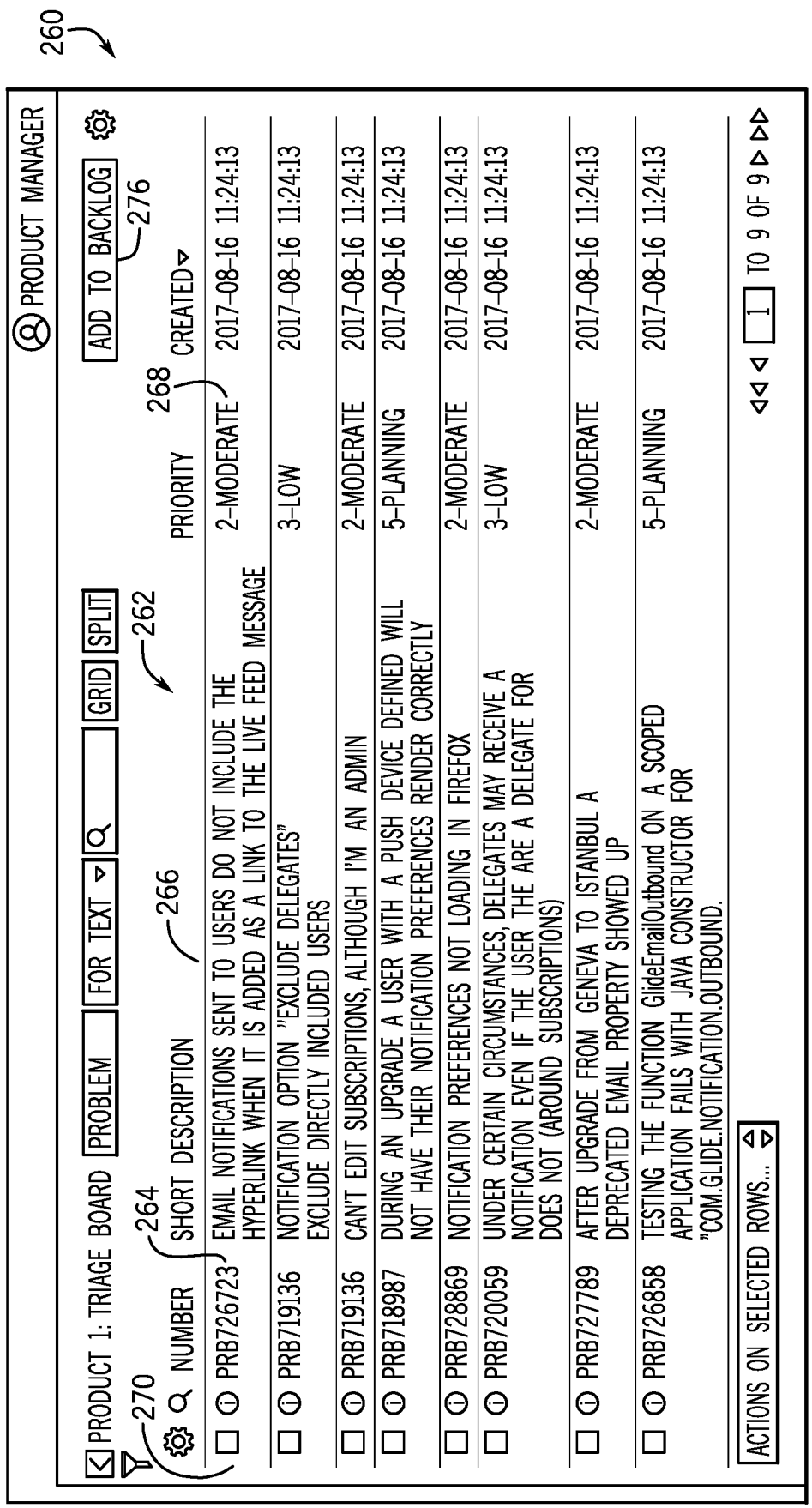
FIG. 5 is an example of a screenshot displaying a user interface to select tasks from the work projects that were triaged, in accordance with aspects of the present disclosure.

FIG. 5 is a screenshot of a user interface 260, displayed via the processor 202, of a list 262 of potential tasks to include in the work backlog from the table selections 224, 228, and 232 with the respective filters 226, 230, and 234 to obtain the desired work projects associated with the user. For example, the list 262 includes problems from table selection 224 that correspond to the filter settings 226. In the illustrated embodiments, the list 262 includes problems that are active with a state of not being closed and assigned to a DEO general group, as described by the filter settings 226. The processor 202 may display the task number 264, the task description 266, and the priority 268 of the potential task within the particular project. The processor 202 may receive one or more selections, via check boxes 270, a select all task command, or the like, indicative of which tasks from the list 262 to include in the unified list described below with respect to FIG. 6.

Figure 6:
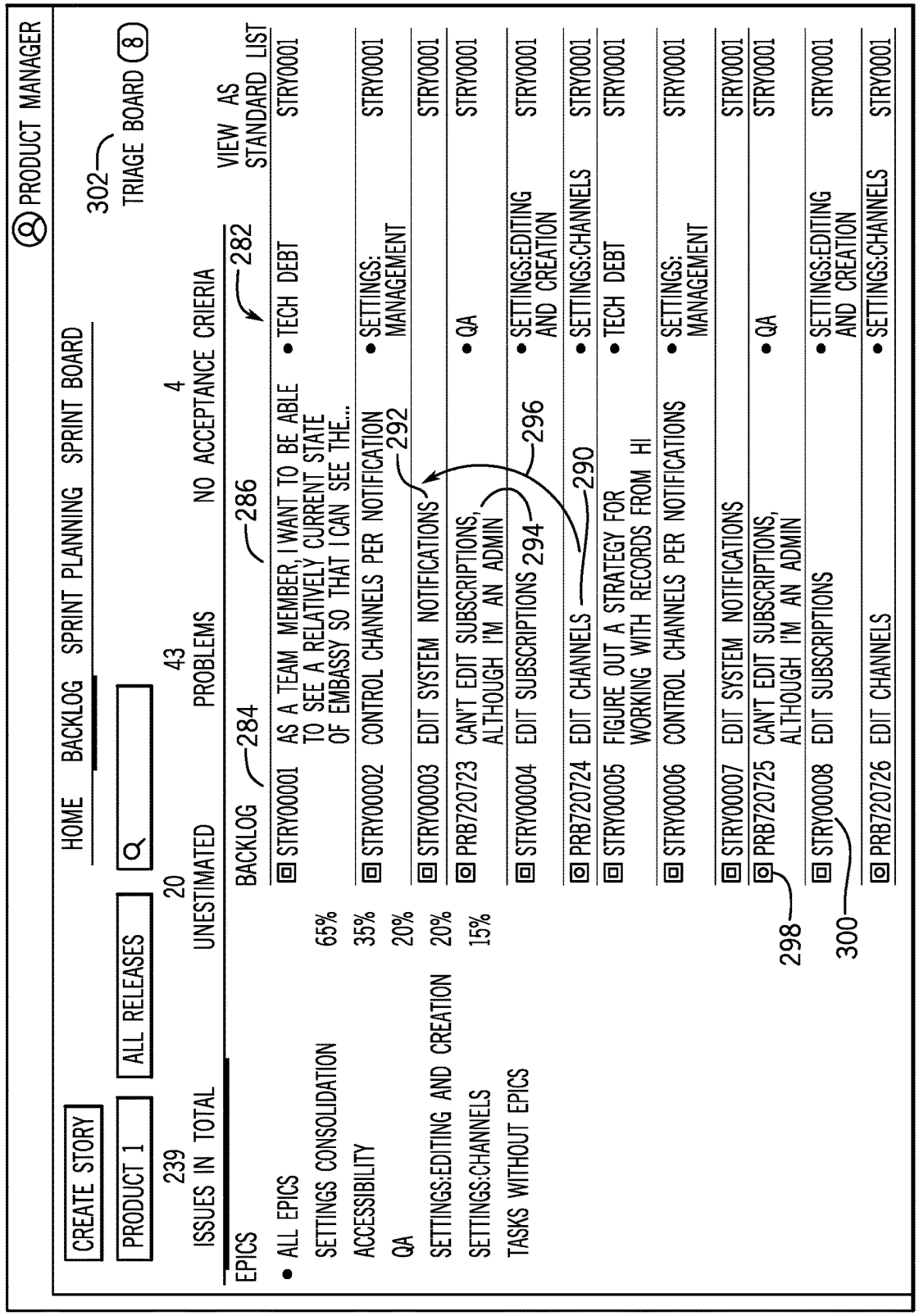
FIG. 6 is an example of a screenshot displaying a user interface that shows a unified list of tasks, in accordance with aspects of the present disclosure.

FIG. 6 is a screenshot of a user interface 280 of a unified list 282 of tasks displayed via the processor 202. As mentioned above, the unified list 282 of tasks may be associated with an account of the user such that the user can plan and rank tasks for different projects in which the user is involved. Upon receiving a selection of one or more of the potential tasks from the list 262 to include in the work backlog, the processor 202 may display the unified list 282 of tasks to be performed. The list 282 may include a task number 284 and a brief description 286 of each task. That is, the processor 202 may display the unified list 262 having different types of tasks associated with different types of projects and assignments. The work backlog may be a sprint backlog, a product backlog, a release backlog, a team backlog, a bug or problem backlog, or any other suitable backlog that may be associated with the account of the worker.

Moreover, the processor 202 may maintain a global ranking of each task of the unified list 282 with respect to one another based on one or more inputs indicating adjustments to the global ranking. For example, the user may drag-and-drop or select arrows to adjust the global ranking. In the illustrated embodiment, the processor 202 may receive a drag-and-drop input to adjust the global ranking of the task 290 to be re-ranked between tasks 292 and 294, as indicated by arrow 296. In this manner, the processor 202 may display the unified list 282 having different tasks in an order based on priorities provided by the user. This may allow the user, in addition to retrieving different tasks from different projects, to have a global rank of the tasks based on user priorities.

In some embodiments, the processor 202 may determine a relationship between at least two tasks in the unified list 282 of tasks. The processor 202 may determine that "can't edit subscriptions, although I'm an admin" problem 298 and "edit subscriptions" story 300 are related to on another. For example, the processor 202 may utilize trained neural networks, gradient descent, or other machine learning techniques to establish a relationship between two tasks in order to better unify disparate lists of tasks. The processor 202 may then provide an indication that the identified tasks are related. For instance, the processor 202 may group related tasks, provide arrows towards similar tasks, color related tasks similarly, or the like. Further, the processor 202 may utilize the machine learning techniques to place the potential tasks selected into the unified list at an expected priority level to reduce re-ranking of the tasks.

Figures 7, 8:
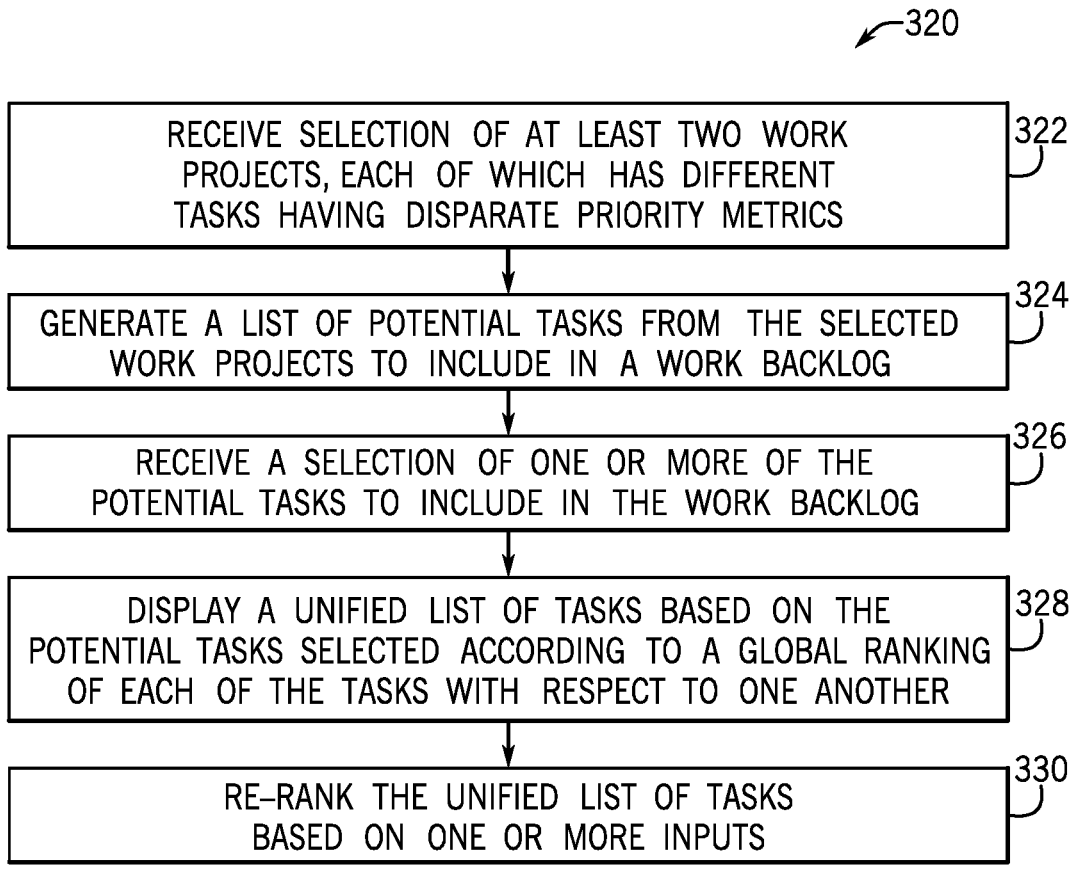
FIG. 7 is a flow diagram of a method to add, remove, re-rank, or modify the unified list of tasks, in accordance with aspects of the present disclosure.
FIG. 8 is an example of a table with a unified list of tasks and each tasks respective rank.

FIG. 7 is a flowchart of a process 320 to be performed by the processor 202 by executing instructions (e.g., code) from the memory 206. The process 320 may begin by receiving one or more selections of at least two projects (block 322). Each of the projects may be associated with a different set of tasks having disparate priority metrics. For example, the processor 202 may receive a first selection of a waterfall project having one or more phase tasks and a second selection of a agile project having one or more stories. The processor 202 may generate a list of potential tasks to include in a work backlog from the selected work projects (block 324). This may include the tasks that correspond to the selected table and the filters of the work project. The processor 202 may then receive a selection of one or more potential tasks to include in the work backlog (block 326). The processor 202 may then display a unified list of tasks based on the potential tasks selected according to a global ranking of each of the tasks with respect to one another (block 328). As further described below, the processor 202 may re-rank the unified list of tasks based on one or more inputs (block 330).

From combining different tasks from different projects, the work backlog may become a longer list of tasks. As mentioned above, re-ranking the tasks may be process-intensive because several tasks may be renumbered from adjusting any given task. As such, the processor 202 may utilize a technique to re-rank and maintain the ranks of the tasks to reduce computation time and complexity. To generate ranks, the processor 202 may determine the last index from a previous generation of ranks and the block size. Block size may refer to a gap of a predetermined amount of ranks between each of the tasks in the unified list of tasks. For example, if the last task was inserted at block 10,000 and the block size is 100, the next rank may be 10,100. The potential tasks that are selected may be added on at the next rank with gaps based on the block size (e.g., a first task at rank 10,100, a second task at rank 10,200, etc.)

Figure 9:
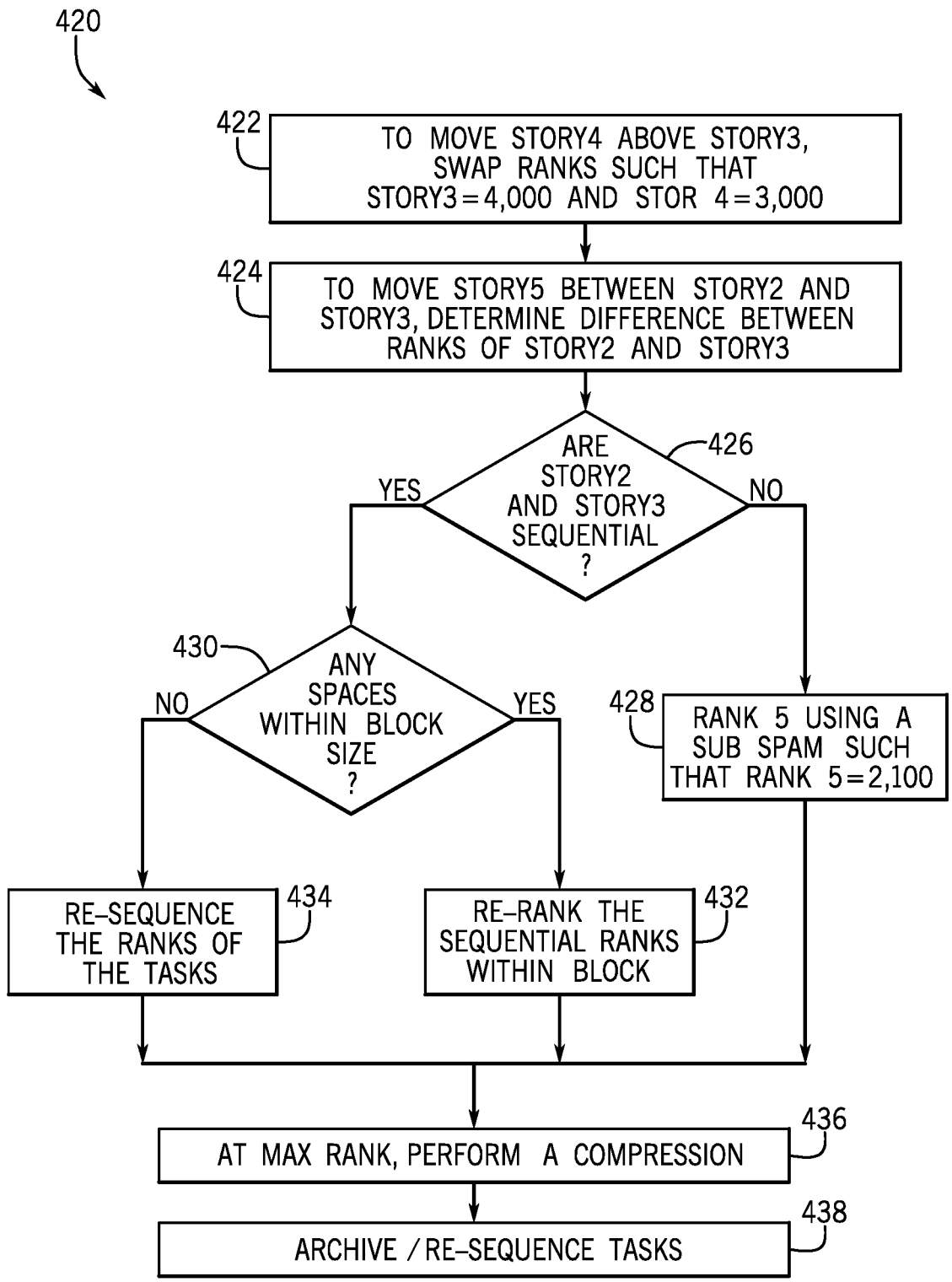
FIG. 9 is a flow diagram of a method to re-rank the tasks of FIG. 7.

FIG. 8 and FIG. 9 are used to describe a process performed by the processor 202 to re-rank tasks in the unified list of tasks. FIG. 8 shows a table 400 of an example of a unified list of tasks. FIG. 9 shows a set of scenarios that may be performed by the processor 202 by executing instructions (e.g., code) stored in the memory 206 to cause the processor 202 to re-rank the unified list of tasks in the table 400. To move 'story4' above 'story3', the processor 202 may swap ranks of 'story4' with 'story3' such that 'story3' is 4000 and 'story4' is 3000 (block 422).

To move 'story5' between 'story2' and 'story3', the processor 202 may determine a difference between the ranks of 'story2' and 'story3' (block 424). The processor 202 may determine whether the ranks of 'story2' and 'story3' are sequential from the difference (e.g., a difference of 1) (diamond 426). If the ranks of 'story2' and 'story3' are not sequential, the processor 202 may take a sub span of a size of the block (e.g., a $10^{th}$ part of the difference) add to the existing rank such that a new rank of 'story5' is 2100 (block 428). In some embodiments, the sub span with may be a predetermined fraction or percentage of the difference. If the difference between two ranks is 1, this may indicate that some ranks are sequential. For example, if the rank of 'story2' is 200 and the rank of 'story3' is 201, the processor 202 may determine if there are free spaces within the block size (diamond 430). If there are free spaces in the block, the processor 202 may re-rank the sequential ranks within the block (block 432). If there are no spaces within the block, the processor 202 may re-sequence the ranks of each task in the unified list of tasks (block 434).

If the unified list of tasks approaches a max rank, the processor 202 may perform a compression of the ranks of the list (block 436). If there are tasks that are determined to be old, for example, if a certain amount of time passes on a task, the processor 202 may archive the task. Further, the processor 202 may re-sequence the tasks at predetermined times (block 438). In some embodiments, the client 102 may send a signal indicative of instructions to cause the application server 107 or database server 108 of the platform 104 to re-sequence the tasks. For example, the platform 104 may re-sequence the tasks according to a schedule. By re-sequencing the tasks separate from management of the tasks on the client device 102, delays on the client device 102 may be reduced while still maintaining the sequence of the unified list of tasks.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
    a non-transitory memory;
    one or more hardware processors configured to execute instructions from the non-transitory memory to cause the system to perform operations comprising:
        from a plurality of projects each having one or more tasks, receiving a first set of selections of at least two projects for generating a backlog having a unified list of tasks, wherein the at least two projects have tasks with disparate priority metrics;
        generating a list of potential tasks to include in the backlog from the selected projects;
        receiving a second set of selections of one or more of the potential tasks to include in the backlog; and
        displaying the unified list of backlog tasks of the backlog based on the potential tasks selected, wherein the unified list of tasks comprises at least two types of tasks from two different projects having disparate priority metrics, and wherein the unified list of tasks comprises a global ranking of each of the backlog tasks with respect to one another to establish priority between each of the backlog tasks, wherein the global ranking arranges a first set of sequential tasks of the backlog tasks with a gap between each subsequent task of the first set of sequential tasks, wherein the gap preserves the global ranking such that the global ranking of the first set of sequential tasks does not change in response to a new task being placed in the gap.

2. The system of claim 1, wherein displaying the list of tasks in the backlog comprises displaying at least one story and at least one problem.

3. The system of claim 1, wherein the one or more hardware processors are configured to execute instructions from the non-transitory memory to perform operations comprising:
    determining a relationship between at least two tasks of the backlog tasks; and
    providing an indication that the at least two tasks are related.

4. The system of claim 1, wherein the one or more hardware processors are configured to execute instructions from the non-transitory memory to perform operations comprising searching the selected projects for suitable tasks to include in the list of potential tasks.

5. The system of claim 1, wherein the one or more hardware processors are configured to execute instructions from the non-transitory memory to perform operations comprising generating gaps between the global ranking of each of the potential tasks from the potential tasks selected.

6. The system of claim 1, wherein the one or more hardware processors are configured to execute instructions from the non-transitory memory to perform operations comprising re-sequencing the global rankings at a predetermined time.

7. The system of claim 1, wherein the selected projects comprise a table with one or more filters that define work of a particular project of the selected projects associated with an account of the system.

8. The system of claim 1, wherein the unified list of tasks is displayed on a display of a first device and the global ranking is re-sequenced at predetermined intervals on a second device.

9. The system of claim 1, wherein the global ranking arranges a second set of sequential tasks of the at least two types of tasks on the unified list of tasks without a gap between each subsequent task of the second set of sequential tasks to preserve the sequence of the second set of sequential tasks with respect to one another.

10. A non-transitory, computer readable medium comprising instructions, wherein the instructions are configured to be executed by a processor to perform operations comprising:
    from a plurality of projects each having one or more tasks, receiving a first set of selections of at least two projects for generating a backlog having a unified list of tasks, wherein the at least two projects have tasks with disparate priority metrics;
    generating a list of potential tasks to include in the backlog from the selected projects;
    receiving a second set of selections of one or more of the potential tasks to include in the backlog; and
    displaying the unified list of backlog tasks of the backlog based on the potential tasks selected, wherein the unified list of tasks comprises at least two types of tasks from two different work projects having disparate priority metrics, and wherein the unified list of tasks comprises a global ranking of each of the backlog tasks with respect to one another to establish priority between each of the backlog tasks, wherein the global ranking arranges a first set of sequential tasks of the backlog tasks with a gap between each subsequent task of the first set of sequential tasks, wherein the gap preserves the global ranking such that the global ranking of the first set of sequential tasks does not change in response to a new task being placed in the gap.

11. The non-transitory, computer readable medium of claim 10, wherein the list of potential tasks correspond to a table and one or more filters of the selected projects.

12. The non-transitory, computer readable medium of claim 10, wherein the instructions are configured to be executed by a processor to perform operations comprising sending a signal indicating re-ranking of the unified list of tasks to another device.

13. The non-transitory, computer readable medium of claim 10, wherein the instructions are configured to be executed by a processor to perform operations comprising:
    determining a relationship between at least two tasks of the backlog tasks; and
    providing an indication that the at least two tasks are related.

14. A method, comprising:
    from a plurality of work projects each having one or more tasks, receiving a first set of selections of at least two work projects for generating a work backlog having a unified list of tasks, wherein the at least two work projects have tasks with disparate priority metrics;

generating a list of potential tasks to include in the work backlog from the selected work projects;

receiving a second set of selections of one or more of the potential tasks to include in the work backlog; and displaying the unified list of backlog tasks of the work backlog based on the potential tasks selected, wherein the unified list of tasks comprises at least two types of tasks from two different work projects having disparate priority metrics, and wherein the unified list of tasks comprises a global ranking of each of the backlog tasks with respect to one another to establish priority between each of the backlog tasks, wherein the global ranking arranges a first set of sequential tasks of the backlog tasks with a gap between each subsequent task of the first set of sequential tasks, wherein the gap preserves the global ranking such that the global ranking of the first set of sequential tasks does not change in response to a new task being placed in the gap.

15. The method of claim 14, comprising moving a first task above a second task in the unified list of tasks, wherein moving the first task above the second task comprises redefining the global ranking of the first task and the second task commensurate with the movement of the first task and the second task relative to the tasks.

16. The method of claim 14, comprising moving a task between two other tasks in the unified list of tasks based at least in part by determining a difference between ranks of the two other tasks.

17. The method of claim 16, comprising assigning a rank between the two ranks of the two other tasks to insert the task between the two other tasks.

18. The method of claim 16, comprising re-ranking the task and the two other tasks within a block of the unified list of tasks when there are spaces within the block.

19. The method of claim 16, comprising re-sequencing ranks of the unified list of tasks when there are no spaces within a block of the unified list of tasks.

20. The method of claim 14, comprising performing a compression of the global ranking of each of the tasks when a maximum rank is reached, wherein the compression comprises archiving a first set of tasks determined to be older than a second set of tasks.

\* \* \* \* \*